March 25, 1952     R. G. LE TOURNEAU     2,590,255
MEANS FOR RETAINING WINDINGS ON ROTORS Filed May 16, 1950     2 SHEETS—SHEET 2

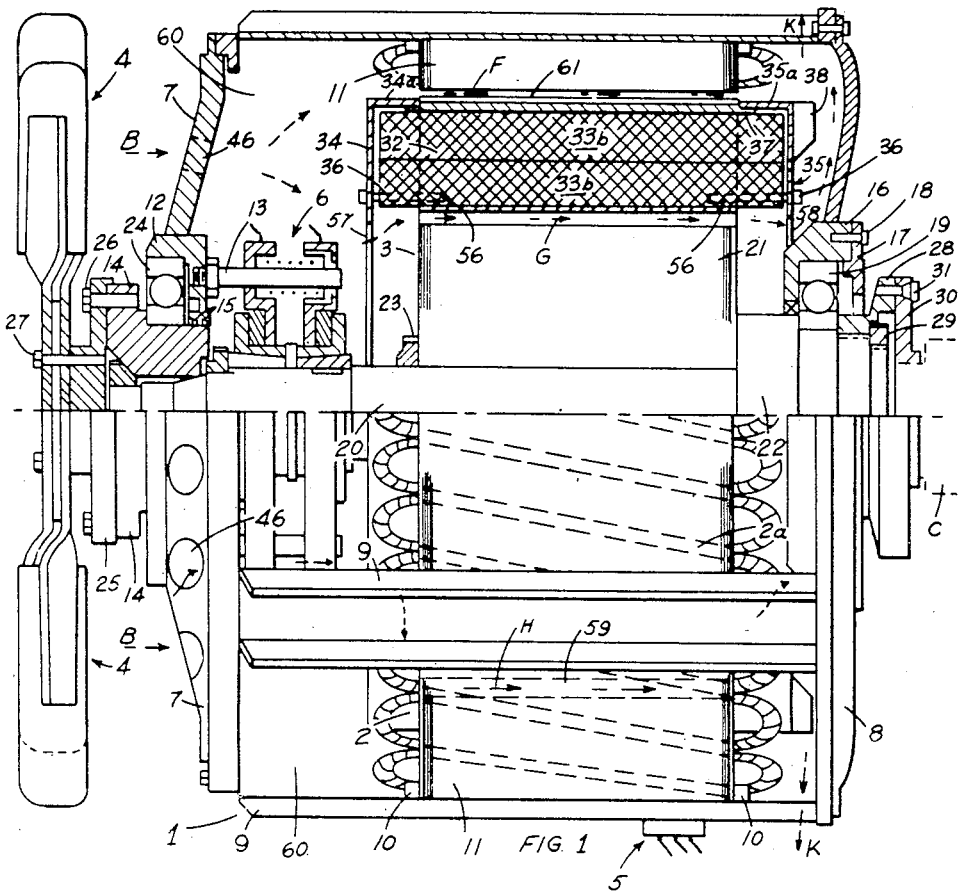

INVENTOR.
R. G. LeTourneau
BY
F. D. Copeland Jr.
AGENT

Patented Mar. 25, 1952

2,590,255

UNITED STATES PATENT OFFICE 2,590,255

MEANS FOR RETAINING WINDINGS ON ROTORS

Robert G. Le Tourneau, Longview, Tex., assignor to R. G. Le Tourneau, Inc., Peoria, Ill., a corporation of California Application May 16, 1950, Serial No. 162,262

8 Claims. (Cl. 171—252)

This invention relates to dynamo-electric machines in which the field windings are contained on the rotor, and in which these windings consist of a number of pre-wound coils.

The primary object of this invention is to provide means for retaining these windings securely in slots in the rotor so that they will not be dislodged by centrifugal force.

A second object is to provide a winding retainer for a rotor slot which employs a retaining wedge having extensions beyond each end of the rotor, and in which the wedge is keyed to the rotor by copper rods which act also as a shading coil and amortisseur winding for the rotor.

Another object is to provide a means whereby the windings, while retained securely in the rotor slots, are spaced from the rotor sufficiently to permit air to pass between the windings and rotor for cooling purposes.

A further object is to provide a winding cover which attaches directly to the rotor end and is aligned by and surrounds an extension on the retaining wedge.

A still further object is to provide a vent plate for insertion in the bottom of the rotor slot to provide a longitudinal air passage thru the rotor.

Other objects and advantages will hereinafter appear and for the purposes of illustration but not of limitation, an embodiment of the invention is shown in the accompanying drawings in which:

Fig. 1 represents a side elevational view in half section of a generator employing this invention.

Fig. 2 is a fragmentary end view showing details of the slot winding retainer and vent plate.

Fig. 3 is a fragmentary side view of a section along the lines 3—3 of Fig. 2 showing the extension of the winding retaining wedge.

Figures 4, 5:
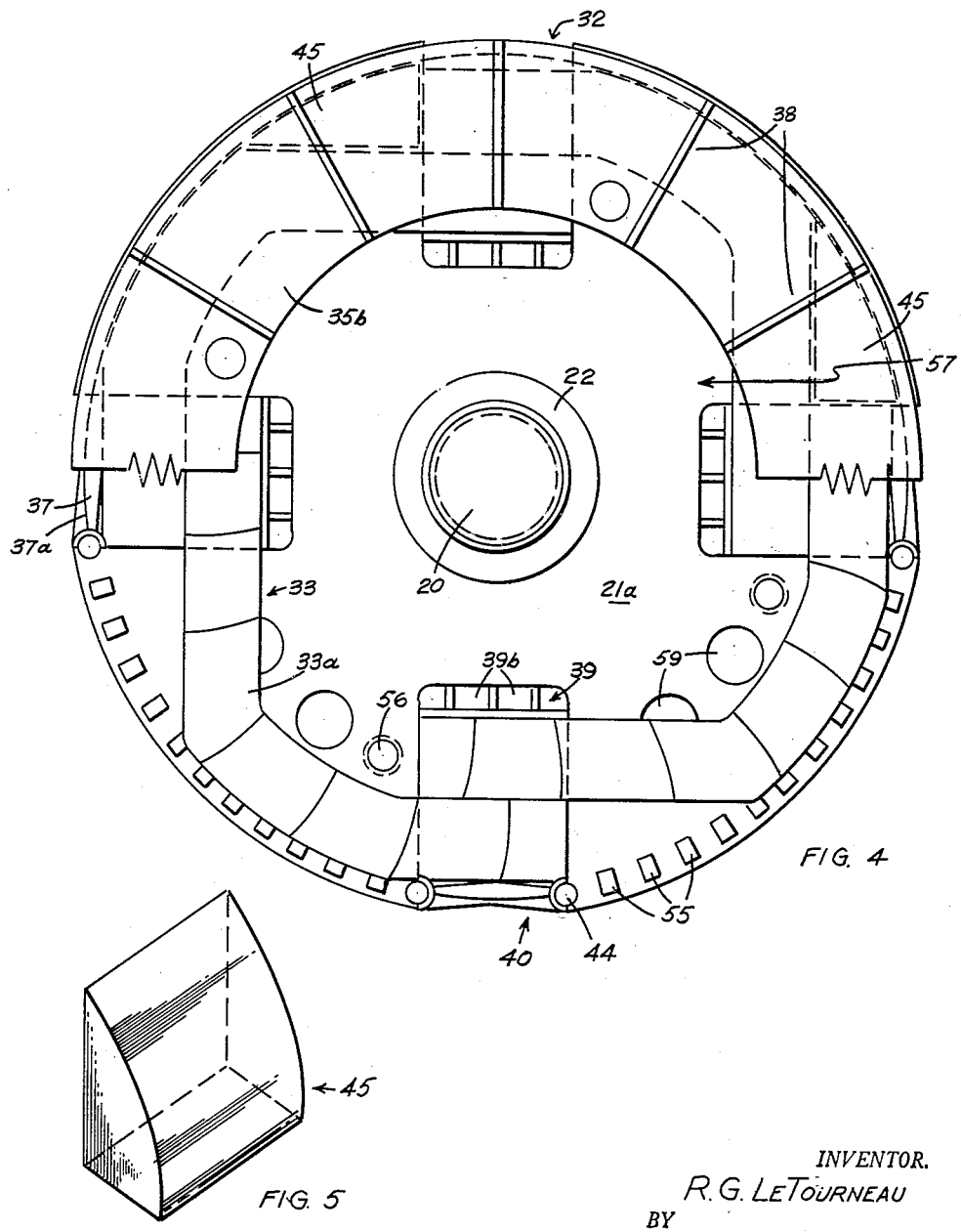
Fig. 4 is an end view of the end of the rotor opposite the brush mechanism with the windings installed and showing the relation between the windings and winding retaining cover.
Fig. 5 is an isometric view of the fibre piece used to hold the windings in position within the winding cover.

Referring now more particularly to the drawings, in Fig. 1 a generator containing a rotor employing the invention at hand is seen to consist basically of a stator frame 1, supporting stator windings 2, a rotor 3 attached at one end to a fan 4 and attached at the other end to an engine crankshaft C, a terminal block 5 from which generated current is taken from the generator, and a slip ring mechanism 6 for supplying exciting current to the rotor.

The slip ring mechanism 6 may be of any desired construction but I prefer to make it in accordance with my co-pending application #117,582, entitled "Slip Ring Arrangement," and filed September 24, 1949.

The stator frame 1 includes front and rear end bells 7 and 8 spaced apart and secured to circumferentially spaced channels 9, which channels by means of annular rings 10 support the stator (or armature) laminations 11, and hold them in place.

These laminations 11 include skewed stator slots 2a to receive stator windings 2. End bell 7 includes a bearing retainer 12 which supports stud 13 of a slip ring mechanism 6. Bearing retainer 12 is sealed from rotating adaptor 14 by a pair of conventional piston rings 15 for a purpose later described. The opposite end bell 8 contains a bearing retainer 16 to which plate 17 is secured by capscrews 18 to enclose ball bearing 19.

The rotor 3 as seen in Fig. 1 includes a shaft 20 upon which a stack of rotor (or field) laminations 21 is keyed, the laminations are then pressed between end plates 21a and clamped in place on the shaft between hub 22 and lock nut 23. At the fan end, rotor 3 is spline connected to adapter 14 by a novel arrangement shown in detail in my co-pending application #727,806 filed February 11, 1947. Adapter 14 is in turn rotatably supported by ball bearing 24 and directly connected to fan spacer 25 by capscrews 26. Bearing 24 encloses an oil pocket 24a which is sealed by the previously mentioned piston rings 15. At its end opposite fan 4, the rotor 3 is splined to a drive adapter 28 which is itself locked in place by splined nut 29 and to which bolt plate 30 is attached by capscrews 31. Plate 30 then engages crankshaft C or any other suitable driving means to rotate the generator rotor. The rotor laminations 21 and their end plate 21a both contain winding slots 32 in which windings 33 are inserted. Cylindrical covers 34 and 35 enclose the exposed end legs 33a of windings 33 and are attached to the rotor by capscrews 36 after being centered on wedge extensions 37. Both end covers include a circular end member 34b and 35b and a cylindrical wall 34a and 35a. One end cover 35 includes blades 38 for circulation of air and heat away from the windings, and to create a low pressure area to assist the blast from fan 4 in creating circulation through the generator as indicated by the arrows F, G, and H. The end members 34b and 35b include central openings 57 and 58 and the end members receive bolts 36 which attach the end covers to rotor 3 by means of tapped holes 56.

The cooling system of this generator may be followed by the arrows shown in Fig. 1. Arrow B represents the direction of the blast of air from fan 4. When this blast reaches end bell 7 it must pass through holes 46 therein to reach area 60 within frame 1. From area 60 the blast B is separated into separate paths as shown by arrows F, G, and H. Path F goes between stator laminations 11 and the circumference 61 of rotor 3. Path G goes through circular opening 57 of end cover 34 and from there through openings 39b formed between depending ribs 39a of vent plate 39 and the bottom 62 of slot 32. Ribs 39a are welded or otherwise secured to a horizontal piece 39c of vent plate 39. Path H goes through opening 57 and into holes 59 of rotor 3. All three paths come together in area 63 adjacent end bell 8 and pass between channels 9 to the outside air as shown by arrows K.

It is observed that the vent plates 39 serve not only to support the windings in their slots but also form a part of the air cooling system. In cooling the machine, it is, of course, desirable to produce an air flow therethrough which is impeded as low as possible and which is not affected appreciably by turbulence in the air stream. For this reason, the end covers 34, 35, besides serving as winding retaining members, present a smooth continuous surface to the air stream induced by the fan 4 to thereby eliminate turbulence and windage losses which otherwise might result from the air stream impinging on the exposed coil ends. It is further observed that the end cover 36 has mounted thereon the blade 38 for aiding and inducing an air flow through the machine. Thus, the retaining means provided herein is functionally inter-related and forms a part of the cooling system.

In Figs. 2 and 3, the novel winding retainer 40 used to hold the longitudinal legs 33b of windings 33 in slots 32 is shown in detail to consist of inwardly bent wedge 41 with semi-circular cups 42 at the lateral edges thereof and longitudinal extensions 37 which project beyond the rotor laminations 21 and end plates 21a at each end. At the top of side walls 53, there is located a semi-circular keyway 43 which aligns with cup 42 to form a full circular opening and to receive a copper rod key 44 which in addition to holding wedge 41 in position, acts as a shading coil for the adjacent poles N and S. Steel bars 55 are equally spaced around the circumference 61 of rotor 3 between copper rods 44 of successive slots 32. Both the copper rods 44 and the steel bars 55 are welded as at 65 to end plates 21a so that they serve as amortisseur windings and shading coils. This construction is similar to that shown in my co-pending application #99,441, filed June 16, 1949. In the reference application it is explained that the flux radiating from the poles adjacent winding slots (such as 32 here) will have a lesser intensity at the copper members (44 here) than adjacent the steel bars 55. In this condition, the stator winding will not be subject to sudden surges of current due to the movement of the rotor past the conductors of the windings. This action is known in the art as a shading or damping effect.

Extensions 37 of wedges 41 are machined (as at 37a) concentric to but of slightly less diameter than the circumference 61 of rotor 3 for the purpose of holding and centering winding covers 34 and 35, as shown in Figs. 1 and 4. These winding covers closely surround end legs 33a of winding 33 and are wedged where necessary by insulating sheets 45a and fibre pieces 45 to securely hold the legs 33a in position. Sheets 45a are inserted where needed in space 34c between cover 34 and windings 33. From this description it will be seen that the windings 33 will be secure with the rotor against any distortion which would be occasioned by the high speed of the rotor (and the resulting centrifugal force), since both the longitudinal legs 33b are held by wedges 41 and the end legs 33a are tightly held in position by end covers 34 and 35 and pieces 45. The end covers are concentric with the rotor since extensions 37 engage their interior surface at several points. This condition will assist greatly in balancing the rotor after construction.

As previously described, the large fan 4 is located external to frame 1 and blows air therein through holes 46 and part of the circulation goes through vent plate 39 which plate together with wedge 41 secures the windings 33 against radial displacement. It will be observed that by placing the fan 4 external to the frame 1, a much larger diameter fan may be employed than one which is installed inside of frame 1.

From the foregoing description it will be readily seen that I have produced such a device as substantially fulfills the objects of the invention as set forth herein.

While this specification sets forth in detail the present and preferred construction of this invention, still in practice such deviations from such detail may be resorted to as do not form a departure from the spirit of the invention, as defined in the appended claims.

Having thus described my invention, what I claim as new and useful and desire to secure by Letters Patent is:

1. Winding retaining means for a dynamo-electric machine comprising: a rotor, a slot in said rotor having side walls therein, keyways in said side walls, a winding inserted in said slot, a wedge, outwardly facing cups at the lateral edges thereof, said cups being in alignment with said keyways and forming an opening therewith, and a rod inserted in each such opening to key the wedge into firm engagement with the walls to retain said winding in said slot.

2. Winding retaining means for a dynamo-electric machine comprising: a rotor, a slot in said rotor having side walls therein, keyways in said side walls, a winding inserted in said slot, a wedge, outwardly facing cups at the lateral edges thereof, said cups being in alignment with said keyways and forming an opening therewith, and a copper rod inserted in each such opening to key the wedge into firm engagement with the walls to retain said winding in said slot.

3. Winding retaining means for a dynamo-electric machine comprising: a rotor, a slot in said rotor having side walls therein, semi-circular keyways in said side walls, a winding inserted in said slot, a wedge, outwardly facing semi-circular cups at the lateral edges thereof, said cups being in alignment with said keyways and forming a full circular opening therewith, and a circular copper rod inserted in each such opening to key the wedge into firm engagement with the walls.

4. In a rotor including winding slots and windings in the slots, a cover surrounding the windings at each end of the rotor, said covers including cylindrical walls and a circular end member, capscrews projecting through said end members to threadedly engage said rotor, a winding retainer bridging the rotor slots, extensions on the winding retainers at each end of the rotor, said extensions machined concentrically with but to a reduced diameter from the circumference of the rotor to engage the interior of the cylindrical walls of said covers.

5. In a rotor including a shaft, a stack of laminations on the shaft, end plates of thicker material than the laminations at each end of the stack, winding slots open at the circumference of the rotor and extending therethrough, windings in said slots, a vent plate spacing said windings away from the bottom of the slots for cooling purposes, a winding retainer bridging the top of said slots and securely holding the windings between said vent plate and retainer, said winding retainer being secured to said rotor by means of copper rods extending longitudinally through the stack of laminations and the end plates; steel bars spaced around the rotor at its circumference and extending through said stack of laminations and said end plates, both said copper rods and said steel bars being welded to said end plates, said rods and bars acting as amortisseur windings, and said copper rods performing the function of shading coils.

6. In a rotor including a shaft, a stack of laminations on the shaft, end plates of thicker material than the laminations at each end of the stack, winding slots open at the circumference of the rotor and extending therethrough, windings in said slots, a vent plate spacing said windings away from the bottom of the slots for cooling purposes, a winding retainer bridging the top of said slots and securely holding the windings between said vent plate and retainer, said winding retainer being secured to said rotor by means of copper rods extending longitudinally through the stack of laminations and the end plates; steel bars spaced around the rotor at its circumference and extending through said stack of laminations and said end plates, both said copper rods and said steel bars being welded to said end plates and acting as amortisseur windings, said copper rods being non-magnetic and adjacent the slots performing the function of shading coils, winding covers comprising end members with large center openings and cylindrical side walls attached to the rotor at each end in surrounding relation to the windings; said winding retainers including integral extensions beyond the end plates, said extensions being machined concentric with the circumference of the rotor, and said extensions engaging the inner surface of said cylindrical side walls and aligning said covers in concentric relation to said rotor.

7. A rotor, including winding slots, windings in the slots, and means for retaining said windings in the slots; comprising a stack of laminations, an end plate at each end of said stack, a series of circumferentially spaced steel bars running longitudinally through said stack and end plates, a wedge for bridging the top of said rotor slots and retaining said windings therein, copper rods placed longitudinally through said stack and end plates and keying said wedge to said rotor, both the copper and steel members welded to each end plate to form shading and amortisseur windings for said rotor.

8. In a generator of the character described, a stator frame, a rotor journaled for rotation within said frame, winding slots in said rotor, a vent plate resting on the bottom of each of said slots and spaced therefrom to allow the passage of air between said plate and the bottom of said slot, windings in said slot resting on said vent plate with the ends of said windings projecting outwardly beyond the opposite ends of said rotor, a fan external to said frame and coupled to said rotor for rotation therewith, means for retaining said windings in said rotor slots, said retaining means including end covers mounted on opposite ends of said rotor and engaging the projected ends of said windings to maintain the same in place and to present a smooth continuous surface for the air flowing from said fan to said rotor, the end cover most remote from the fan having mounted thereon an air blade arranged to aid in inducing a flow of air in the space between said vent plate and slot bottom.

ROBERT G. LE TOURNEAU.

REFERENCES CITED

The following references are of record in the file of this patent:

UNITED STATES PATENTS

| Number | Name | Date |
|---|---|---|
| 383,659 | Schmid | May 29, 1888 |
| 561,590 | Ide | June 9, 1896 |
| 610,067 | Lamme | Aug. 30, 1898 |
| 798,222 | Siegfried | Aug. 29, 1905 |
| 1,042,408 | Dearborn | Oct. 29, 1912 |
| 1,998,087 | Koch | Apr. 16, 1935 |

FOREIGN PATENTS

| Number | Country | Date |
|---|---|---|
| 58,041 | Austria | Oct. 15, 1912 |
| 179,017 | Great Britain | May 4, 1922 |
| 666,851 | France | May 28, 1929 |
| 89,866 | Switzerland | July 1, 1921 |